(12) United States Patent
Arnaut

(10) Patent No.: US 6,797,053 B2
(45) Date of Patent: Sep. 28, 2004

(54) PLASTER RETARDING COMPOSITION

(75) Inventor: Filip Arnaut, Roosdaal (BE)

(73) Assignee: Puratos Naamzoze Vennooschap, Groot-Bijaarden (BE)

(*) Notice: Subject to any disclaimer, the term of this patent is extended or adjusted under 35 U.S.C. 154(b) by 0 days.

(21) Appl. No.: 09/902,441

(22) Filed: Jul. 9, 2001

(65) Prior Publication Data

US 2002/0108538 A1 Aug. 15, 2002

(30) Foreign Application Priority Data

Jul. 10, 2000 (EP) .......................................... 00870159

(51) Int. Cl.$^7$ .............................................. C04B 22/00
(52) U.S. Cl. ...................................................... 106/819
(58) Field of Search ........................................ 106/819

(56) References Cited

U.S. PATENT DOCUMENTS

| | | | |
|---|---|---|---|
| 3,772,045 A | * | 11/1973 | Haldas et al. |
| 4,013,509 A | | 3/1977 | Kamatani et al. |
| 4,094,693 A | | 6/1978 | Knorre et al. |
| 4,190,454 A | * | 2/1980 | Yamagisi et al. |
| 5,290,572 A | | 3/1994 | MacKeen |

FOREIGN PATENT DOCUMENTS

| | | |
|---|---|---|
| DE | 1177121 | 9/1964 |
| JP | 51136618 | 11/1976 |

OTHER PUBLICATIONS

"Retardation of gypsum plaster by calcium tartrate" Donnison et al. Commonwealth Bur Dental Stds., Melbourne, J Dental Res (1963), 43(2), 587–93, 1963.*
"Retarding action of gypsum plaster retarders of various chemical composition in relation to the pH value of the plaster" Mallon ZKG Int'l EditionB (1998), 41(6) 309–11, 1988.*
Th. Mallon, Retarding action of gypsum plaster retarders of various chemical composition in relation to the pH value of the plaster, ZKG International, vol. 41, No. 6, pp. 309–311, 1988, XP–002155162.
G. Forg, Influence of various retarders on the crystallization and strength of plaster of Paris, ZKG International, vol. 42, No. 5, pp. 229–232, 1989, XP–002155163.
E. C. Combe, et al., The effects of some organic acids and salts on the setting of gypsum plaster II. tartrates, Journal of Applied Chemistry, vol. 15, pp. 367–372, Aug. 15, 1965.
A. A. Akhrem, et al., Calcium Tartrate Gel, Analytical Biochemistry, vol. 179, pp. 86–89, 1989, XP–000972528.
European Search Report for EP00870159 (3 pages).
Translation of Claim 1 of German Patent No. 1177121.

* cited by examiner

Primary Examiner—Paul Marcantoni
(74) Attorney, Agent, or Firm—Knobbe, Martens, Olson & Bear, LLP

(57) ABSTRACT

The present invention is related to a calcium tartrate plaster retarding composition, characterised in that it has a mean particle size lower than 30 μm. The present invention is also related to the plaster comprising said composition and to the preparation process of said composition.

8 Claims, 4 Drawing Sheets

PLASTER RETARDING COMPOSITION

CROSS-REFERENCE TO RELATED APPLICATIONS

This application claims priority to European Application Serial Number 00870159.1 filed on Jul. 10, 2000, the disclosure of which is incorporated herein by reference in its entirety.

BACKGROUND OF THE INVENTION

1. Field of the Invention

The present invention is related to a plaster retarding composition.

2. Description of the Related Art

The setting of plaster of Paris is known for a long time. Gypsum plaster sets quickly due to its natural process of crystallisation.

This crystallisation of gypsum ($CaSO_4 \cdot 2H_2O$) from a suspension of Ca sulfate hemihydrate is known as the setting of plaster. For commercial applications, the retardation of plaster to a desired level is required.

In the 1960's it was reported that tartaric acid and calcium tartrate had negligible retarding action in the setting of plasters. Potassium sulfate was also reported to accelerate the setting (Combe, E. C., *Chemical Abstracts*, Vol. 63, p. 12855).

Later, when the retarding action of gypsum plaster retarders of various chemical compositions was studied in relation to the pH value of the plaster, it was shown that tartaric acid and tartrates were capable of fully developing their retarding action only under strongly alkaline pH (Mallon, T., *ZKG Int., Ed. B*, Vol. 41(6), pp. 309–311 (1988)). The effects of retards (citric acid, malic acid, and tartaric acid) on the setting behaviour of plaster were studied to produce plasters with special properties which met site requirements. There it was shown that the retarders need varying amounts of Ca ions to be effective. The gypsum-tartaric acid system required additional $Ca(OH)_2$. Tartaric acid —$Ca(OH)_2$ had the largest effect retarding effect on plaster of Paris. Significant changes in crystal development were observed, the strength was halved, and setting retardation was significant. (Forg, G., *ZKG Int., Ed. B*, Vol. 42(5), pp. 229–32 (1989)).

It has been known for a long time that the particle size of the gypsum is of importance to the setting characteristics of plaster and to the mechanical properties of the hardened product (U.S. Pat. No. 3,652,309 and DE 3048506). It is also known that calcium tartrate may be obtained from various distillery wastes (vinasse) (FR 2109317 and EP 0919535A1), or by other processes as described in the documents GB 1183449 and U.S. Pat. No. 3,957,579.

The present invention aims to provide an improved retarding compositions for plaster that does not present the drawbacks of the state of the art, especially a product that can be easily manipulated and used by construction hands on building sites, such as plasterers, etc. A further aim of the present invention is to provide such a composition which has improved retarding characteristics for plaster and other related products.

SUMMARY OF THE INVENTION

Although the use of calcium tartrate as a retarder in the setting of plaster products is already described, the inventors have surprisingly found that reducing the particle size (granulometry) of a calcium tartrate polydispersed composition improves unexpectedly the retarding plaster setting. This means that a given amount of calcium tartrate with the reduced particle size will retard the setting of plaster more efficiently than the same amount of calcium tartrate with a non reduced (higher) particle size.

Therefore, a first aspect of the present invention is related to a preferably uncoloured polydispersed plaster retarding composition having a mean particle size lower than 30 $\mu$m, preferably lower than 25 $\mu$m, more preferably lower than 20 $\mu$m, advantageously lower than 18 $\mu$m or lower than 15 $\mu$m.

Advantageously, said composition comprises less than 5%, more preferably less than 1%, more preferably less than 0.1%, of particles having a particle size higher than 40 $\mu$m (the total of the particles being 100%).

The present invention is also related to the preparation process of said calcium tartrate composition wherein particles of calcium tartrate obtained after crystallisation from products resulting from distillery waste (vinasse) or from other biological processes, are purified and submitted to a reduction of particle size by various classical means such as milling, grinding in a mortar by impact in pneumatic dryers or other methods well known by the person skilled in the art. Preferably, the calcium tartrate is obtained according to the following steps:

- cis-epoxysuccinate is obtained by catalytic epoxidation of maleic acid (preferably by using the method and the enzyme described in the document WO 99/21972),
- the cis-epoxysuccinate is thereafter submitted to an enzymatic action of an epoxy hydrolase for obtaining L-tartaric acid which is precipitated with an equimolar amount of $CaCl_2$ in a 35% solution in order to obtain calcium tartrate crystallisation,
- the obtained crystals are thereafter submitted to a grinding process in a mortar in order to obtain the specific calcium tartrate composition according to the invention.

Calcium tartrate crystals can also be obtained in a almost 99% pure calcium tartrate.$4H_2O$ by using tartaric acid obtained from natural sources such as raisin or tamarind (see FR 2109317, EP 0919935A1, GB 1183449, U.S. Pat. No. 3,957,579, incorporated herein by reference).

Another aspect of the present invention is related to a plaster composition comprising the calcium tartrate retarding composition according to the invention, possibly combined with other additives already used in plaster compositions, preferably one or more additives selected from the group consisting of citric acid, acrylic latex, aliphatic alcohol, magnesium sulfate, potassium sulfate, cellulose ether, malic acid, adipic acid, several tartaric acids such as L(+)-tartaric acid, D,L-tartaric acid and meso-tartaric acid, salts of said tartaric acids such as potassium and sodium tartrates and corresponding bitartrates, protein hydrolysates, monocalcium phosphate, ketogluconic acid, starch ethers, calcium hydroxide and calcium carbonate.

The plaster composition according to the invention can be used in any suitable plaster composition usually used in construction sites by plasterers such as wall plaster (putzgips, maschinenputzgips), plaster boards, ready-to-use plaster, gypsum filler or coat plaster.

Preferably, the specific calcium tartrate retarding composition according to the invention can find applications as a retarder in the setting of any calcium sulfate hemihydrate composition wherein a retarding effect of such composition is needed.

The calcium hydrate used in said plaster can be obtained from any source such as mining or from fly ash. Said composition can be a β-calcium sulfate hemihydrate form or any other crystalline form well known by the person skilled in the art (α form, anhydride I, II or III, etc.).

The calcium tartrate retarding composition according to the invention can also find other applications in the retarding of the setting for other related products presented in a powder form such as cement (that find also applications on construction sites for the preparation of mortar, concrete constructions, etc.).

Preferred compositions of the calcium tartrate retarding composition according to the invention are described in the following examples.

A preferred particle size distribution is described in the Figures and in Table 1, which are presented as preferred and non-limiting execution examples of the present invention.

DETAILED DESCRIPTION OF THE PREFERRED EMBODIMENT

Figure 1:
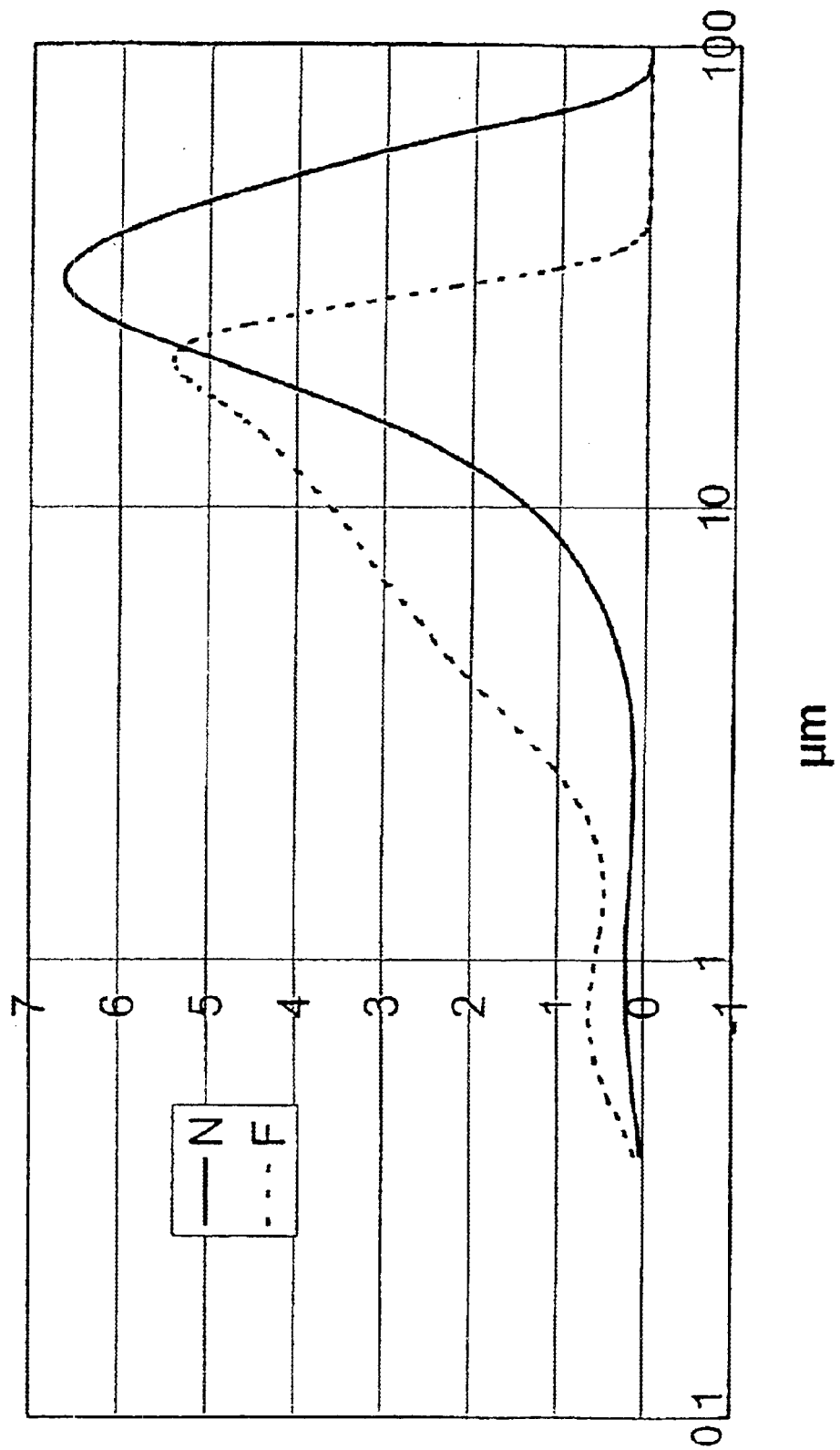
FIG. 1 represents the particle size distribution of two calcium tartrate samples with a logarithmic scale as x-axis.

In the traditional process tartaric acid is prepared from crude calcium tartrate and refined for use in the food industry or as an analytical reagent. Thus calcium tartrate is acidified with $H_2SO_4$ in an aqueous suspension at 60–90° C., $CaSO_4$ is removed by filtering, the solution is further cleaned by filtration over active C and bentonite, and the filtrate is desalted with ion exchangers and concentrated by vacuum distillation and is crystallised.

The crude calcium tartrate used in the production of tartaric acid (min. 50% purity) is recovered from alkaline solutions resulting from the detartrating of wine vats (potentially containing 140–250 g tartaric acid/L) by acidification to a pH of maximum 8, addition of a calcium salt to precipitate calcium tartrate, and recycling of part of the filtrate. Thus, hydrochloric acid may be used for acidification to pH 6.3 to pH6.6 and calcium chloride may be used to precipitate calcium tartrate (EP 0919535A1).

The recovery of calcium tartrate from distillery wastes (vinasse) is also facilitated by good crystallisation, made possible by precise temperature control during neutralisation, and by improved separation of the crystals (FR 2109317).

An optimum pH of 6.0 for precipitation of calcium tartrate from wastes in wine manufacturing was estimated on the basis of analytical calculations and practical results obtained in experiments with model solution and industrial eluates. This pH value was recommended as the technological parameter for neutralisation under industrial conditions (Parfenteva, T. L., *Izv. Vyssh. Uchebn. Zaved., Pishch. Tekhnol.*, Vol. (2), pp. 59–61 (1975) in Chemical Abstract 1975:512299).

Beside these traditional methods, it is also possible to obtain calcium tartrate by chemical synthesis. The example of the most direct method for producing D,L-Calcium tartrate is: An aqueous solution of 2 moles maleic anhydride was treated with 75 g $Ca(OH)_2$ and thereafter with $K_4Fe(CN)_6$ to remove Fe (18 mg) and then dropwise with 2 g $K_2WO_4$ and 100 g 35% $H_2O_2$ at 60° C. to give 98% calcium tartrate (as described in the document U.S. Pat. No. 3,769,339).

The preparation of tartaric acid from maleic acid or anhydride may be obtained by reaction with $H_2O_2$ in aqueous solution at a pH of 1 to 2 in the presence of $H_2WO_4$ as catalyst. To obtain high yields (70%), excess maleic acid must be used. Fe ion concentration in the solution should be reduced to less than 30 to 40 ppm, e.g. by precipitation with $K_4Fe(CN)_6$. Thus, 196 g maleic anhydride was dissolved in 400 ml $H_2O$ at 60° C. and 75 g $Ca(OH)_2$ added to the solution. The solution contained 18 mg of Fe which was precipitated with 400 mg $K_4Fe(CN)_6.3H_2O$ and filtered with active C. $H_2WO_4$ (2 g) in the form of the potassium salt was added, followed by dropwise addition at 60° C. of 100 g 35% $H_2O_2$ (stabilised by 0.1% of dipicolinic acid). The mixture was stirred for 2 hours at 60–65° C., then 1 hr at 70–80° C., and then refluxed 2 hours and cooled to give 243 g calcium tartrate.$4H_2O$. Another 20 g of the salt was obtained by precipitation by 22 g $Ca(OH)_2$, total yield 98% (GB 1183449).

It is possible to obtain sodium L(+)-tartrate by hydrolysing cis-epoxysuccinate by an epoxide hydrolase of Achromobacter and Alcaligenes. The cis-epoxysuccinate is obtained by catalytic epoxidation of maleic acid. After the complete conversion of the sodium cis-epoxysuccinate to sodium L-tartrate, calcium chloride is added, the calcium tartrate precipitates and is collected by filtration (U.S. Pat. No. 3,957,579).

The retarding of the crystallisation of $CaSO_4.0.5H_2O$ in water is of economical and practical importance. It enables the craftsman to use the mixture for a longer time and it makes to use of mechanical pumping and applying of plaster practical possible.

One of the most effective retarders is tartaric acid in alkaline medium. In practice, tartaric acid crystals and $Ca(OH)_2$ are mixed in dry form with the gypsum. This retards the setting action of plaster significantly.

EXAMPLE 1

The calcium tartrate used was obtained by precipitating L-tartaric acid by an equimolar amount of $CaCl_2$ in a 35% solution. The L-tartaric acid used was obtained by action of a epoxide hydrolase on cis-epoxysuccinate. The cis-epoxysuccinate was obtained by catalytic epoxidation of maleic acid (preferably the enzyme described in the document WO 99/21972.

The calcium tartrate crystals obtained were 99% pure calcium tartrate.$4H_2O$. Also tartaric acid from natural sources as raisins or tamarind might be used to obtain the calcium tartrate.$4H_2O$. After precipitation the crystals were air dried in a fluidised bed. The collected crystal are designated as "Normal (N)". Part of the crystals are ground in a mortar. Any other mill or grinding device or pneumatic dryer device could fulfil the same purpose. Sample after grinding is designated "Fine (F)". The particle size distribution was determined by laser diffraction (Coulter—LS 200, Fraunhofer optical model). It should be noted that the algorithm used to calculate the particle size distribution can influence the end result. The 95% confidence interval for the range 5–60 μm was ±1 μm.

Tables 1 and 2 describe the particle characteristics of two calcium tartrate samples N and F:

TABLE 1

| Particle size (μm) | Normal (%) | Fine (%) |
|---|---|---|
| 0.869 | 0.21 | 0.6 |
| 0.953 | 0.21 | 0.57 |
| 1.047 | 0.21 | 0.54 |
| 1.149 | 0.2 | 0.5 |
| 1.261 | 0.19 | 0.47 |
| 1.385 | 0.17 | 0.45 |
| 1.52 | 0.16 | 0.46 |
| 1.669 | 0.15 | 0.49 |
| 1.832 | 0.14 | 0.55 |
| 2.01 | 0.13 | 0.63 |
| 2.207 | 0.12 | 0.75 |
| 2.423 | 0.12 | 0.89 |
| 2.66 | 0.12 | 1.06 |
| 2.92 | 0.13 | 1.25 |
| 3.206 | 0.14 | 1.45 |
| 3.519 | 0.16 | 1.65 |
| 3.862 | 0.19 | 1.86 |
| 4.241 | 0.24 | 2.07 |
| 4.656 | 0.29 | 2.26 |
| 5.111 | 0.35 | 2.45 |
| 5.611 | 0.43 | 2.62 |
| 6.156 | 0.52 | 2.79 |
| 6.761 | 0.63 | 2.96 |
| 7.421 | 0.76 | 3.12 |
| 8.147 | 0.92 | 3.27 |
| 8.944 | 1.1 | 3.42 |
| 9.819 | 1.32 | 3.59 |
| 10.78 | 1.58 | 3.78 |
| 11.83 | 1.89 | 3.98 |
| 12.99 | 2.26 | 4.18 |
| 14.26 | 2.69 | 4.39 |
| 15.65 | 3.18 | 4.65 |
| 17.18 | 3.72 | 4.95 |
| 18.86 | 4.3 | 5.25 |
| 20.7 | 4.9 | 5.4 |
| 22.73 | 5.449 | 5.2 |
| 24.95 | 6.01 | 4.53 |
| 27.38 | 6.41 | 3.45 |
| 30.07 | 6.62 | 2.19 |
| 33 | 6.6 | 1.04 |
| 36.24 | 6.36 | 0.33 |
| 39.77 | 5.92 | 0.052 |
| 43.66 | 5.35 | 0.003 |
| 47.93 | 4.69 | 0 |
| 52.63 | 3.97 | 0 |
| 57.77 | 3.19 | 0 |
| 63.41 | 2.34 | 0 |
| 69.62 | 1.36 | 0 |
| 76.43 | 0.56 | 0 |
| 83.9 | 0.11 | 0 |
| 92.09 | 0.0091 | 0 |

TABLE 2

|  | Normal (N) | Fine (F) |
|---|---|---|
| Mean μm | 30,8 | 13,1 |
| Median μm | 28,84 | 11,72 |
| Mean/Median Ratio: | 1,068 | 1,118 |
| d10 μm: | 10,43 | 2,45 |
| d50 μm: | 28,84 | 11,72 |
| d90 μm: | 54,62 | 25,81 |
| Specific Surf. Area | 4639 | 12131 |
| % < | μm | μm |
| 10 | 10,43 | 2,45 |
| 25 | 18,49 | 5,645 |
| 50 | 28,84 | 11,72 |
| 75 | 41,41 | 19,72 |
| 90 | 54,62 | 25,81 |

Figure 2:
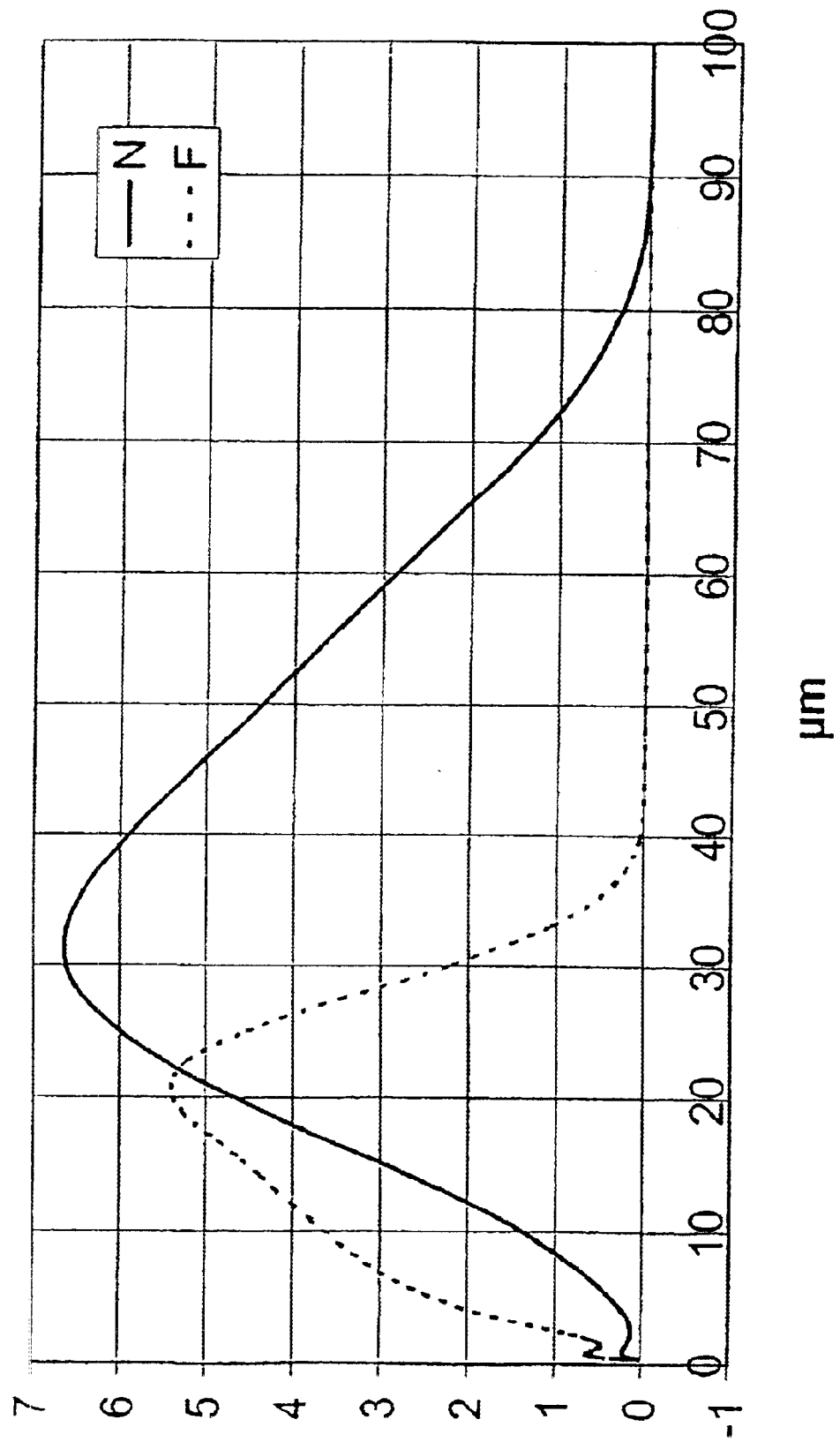
FIG. 2 represents the particle size distribution of the two calcium tartrate samples used for FIG. 1 with a linear scale as x-axis.

The difference between N and F is also illustrated by FIGS. 1 and 2. FIG. 1 has a logarithmic scale for the x-axis while FIG. 2 has a linear scale for the x-axis.

The two different tartrates were tested for their retarding action. Therefore the mixtures mentioned in Table 3 were made.

TABLE 3

|  | Natural gypsum[3] | Ca(OH)2 | Ca-tartrate | $H_2O$ |
|---|---|---|---|---|
| Mix 1 | 99.2 g | 0.6 g | 0.20[1] g | 50 ml |
| Mix 2 | 99.2 g | 0.6 g | 0.20[2] g | 50 ml |

Calcium tartrate type: [1]type N, [2]type F
Natural Gypsum [3]Bricobi® fine plaster The pH of the mix should be alkaline and preferably above 11.0. A higher pH might affect the absolute performance of the retarders, but not the relative performance. In the two cases, the pH was 11.85 (determined as a 5% solution of dry mix in water).

The setting of the plaster was measured by a SMS TA-XT2I™ texture analysis system. This basically exists of a plunger that is lowered at a constant speed to a given penetration depth (10 mm below the surface in this case). The force for penetration was registered. In time, when setting occurs the force needed to penetrate the paste is increasing. The more the efficient the retarder, the later this increase occurs and the flatter the increase curve.

Figure 3:
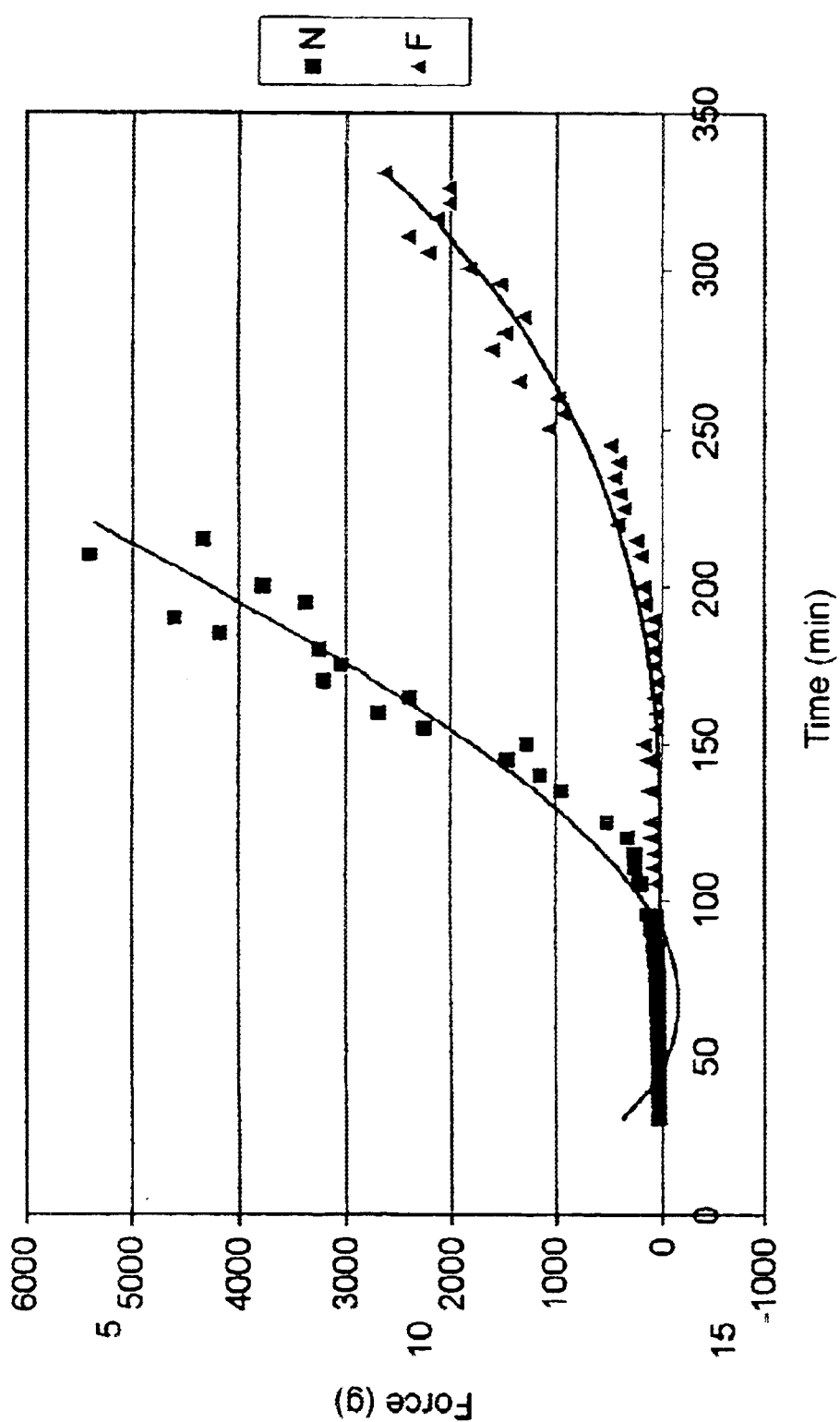
FIG. 3 represents the force for penetration of a plunger in the two calcium tartrate samples used for FIGS. 1 & 2.

This is illustrated in FIG. 3. It is clear that the fine granulometry enhances considerably the retarding effect of the calcium tartrate added.

EXAMPLE 2

This Example compares the efficiency of the calcium tartrate with tartaric acid.

TABLE 4

|  | Natural Gypsum[1] | Ca(OH)$_2$ | Tartaric acid | Calcium tartrate F | Water | pH in 5% solution |
|---|---|---|---|---|---|---|
| Mixture 3 | 97.7 | 2.3 |  |  | 50 | 11.90 |
| Mixture 4 | 96.0 | 3.8 | 0.2 |  | 50 | 11.95 |
| Mixture 5 | 97.5 | 2.3 |  | 0.20 | 50 | 11.87 |
| Mixture 6 | 97.4 | 2.3 |  | 0.30 | 50 | 11.90 |

Natural Gypsum[1] Bricobi ™ fine plaster

Noticeably more Ca(OH)$_2$ was added compared to Example 1. The pH did however change not markedly. Notice the extra amount Ca(OH)$_2$ needed to correct for the tartrate acidity.

The setting was determined as in Example 1.

Figure 4:
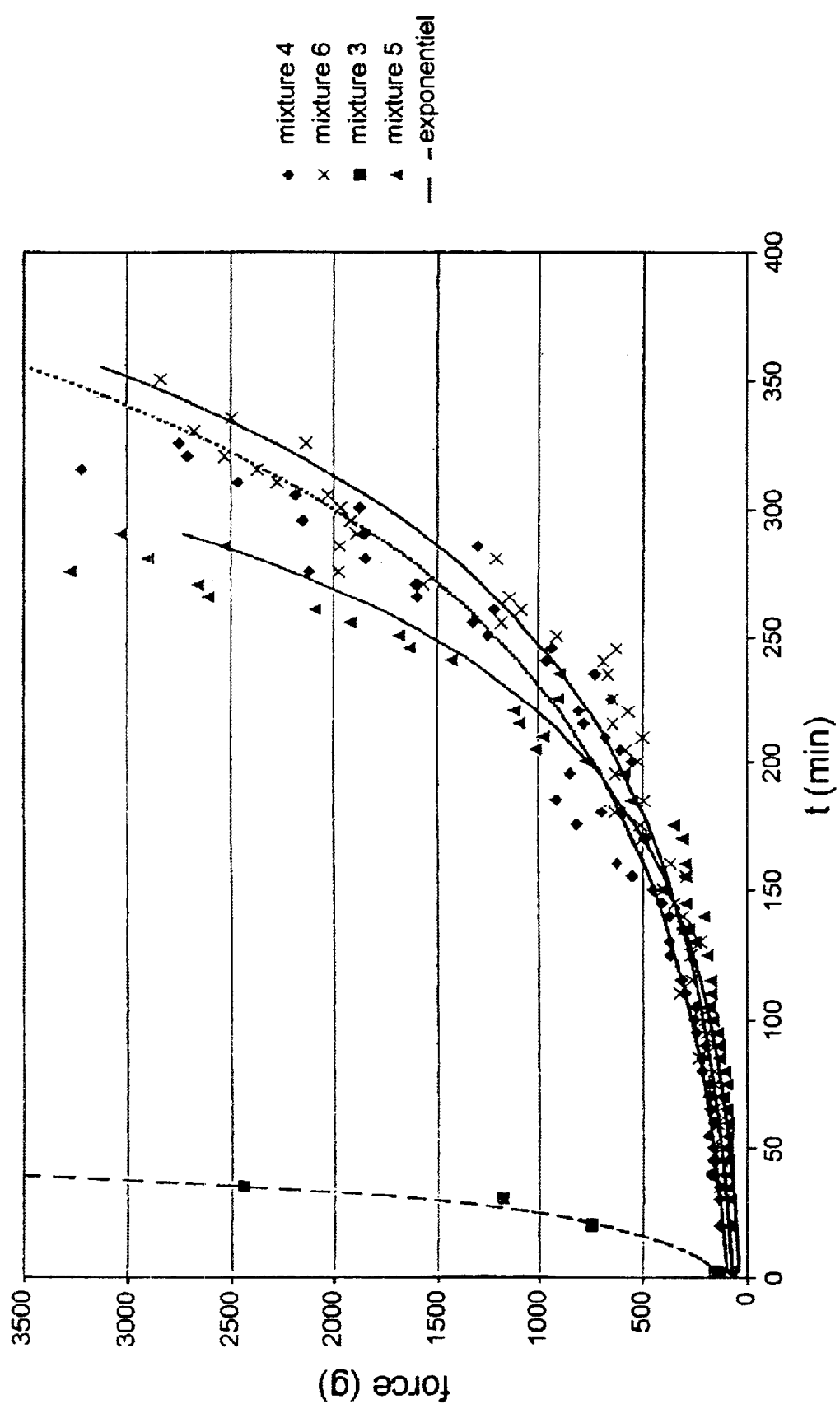
FIG. 4 represents the force for penetration of a plunger for various calcium tartrate compositions according to the invention compared to a composition without retarder.

This is illustrated by FIG. 4, where an exponential curve was fitted through the data. It is clear from the figure that more calcium hydroxide is needed in mixture 4 to compensate for the tartaric acid. The Example shows that in weight more calcium tartrate is needed compared to tartaric acid. Here the factor is 1.5. The error on the measurements is such that the factor might be between 1.3 and 1.7. If the calcium tartrate F is as efficient as the tartaric acid the equivalence on a molar basis is 1.73 weight of calcium tartrate for 1 weight of tartaric acid.

What is claimed is:

1. A powder comprising calcium tartrate particles having a mean particle size less than about 30 μm, wherein the powder is selected from the group consisting of plaster, cement, mortar, and concrete.

2. A powder comprising calcium tartrate particles having a mean particle size less than about 18 µm, wherein the powder is selected from the group consisting of plaster, cement, mortar, and concrete.

3. The powder of claim 1, wherein said calcium tartrate particles having a mean particle size less than about 25 µm.

4. The powder of claim 1, wherein said calcium tartrate particles having a mean particle size less than about 20 µm.

5. The powder of claim 1, wherein less than 5% of said particles have a particle size greater than about 40 µm.

6. The powder of claim 5, wherein less than 1% of said particles have a particle size greater than about 40 µm.

7. The powder of claim 5, wherein less than 0.1% of said particles have a particle size greater than about 40 µm.

8. The powder of claim 2, wherein said calcium tartrate particles having a mean particle size less than about 15 µm.

* * * * *